(12) United States Patent
Makowski et al.

(10) Patent No.: US 7,697,499 B2
(45) Date of Patent: Apr. 13, 2010

(54) METHOD FOR INTEROFFICE TRUNK TESTING

(75) Inventors: Steven L. Makowski, Naperville, IL (US); Peter Charles Tomasino, St. Charles, IL (US); Edward Anthony Uram, II, Lemont, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 946 days.

(21) Appl. No.: 10/447,504

(22) Filed: May 29, 2003

(65) Prior Publication Data

US 2004/0240421 A1  Dec. 2, 2004

(51) Int. Cl.
*H04J 3/00* (2006.01)
(52) U.S. Cl. .................. 370/345; 370/235; 370/248; 370/251
(58) Field of Classification Search .......... 370/345, 370/235, 251, 248, 253, 340, 351; 379/24, 379/240, 243, 26.01, 27.01
See application file for complete search history.

(56) References Cited

U.S. PATENT DOCUMENTS

| | | | | |
|---|---|---|---|---|
| 3,705,275 A | * | 12/1972 | Leyburn et al. | 379/24 |
| 3,748,396 A | * | 7/1973 | Hestad et al. | 379/196 |
| 3,829,628 A | * | 8/1974 | Tripsas | 379/14 |
| 4,059,730 A | * | 11/1977 | Messerschmitt et al. | 370/435 |
| 4,247,742 A | * | 1/1981 | Thelen | 379/24 |
| 4,592,048 A | * | 5/1986 | Beckner et al. | 370/354 |
| 4,611,320 A | * | 9/1986 | Southard | 370/241 |
| 4,996,695 A | * | 2/1991 | Dack et al. | 375/224 |
| 5,111,497 A | * | 5/1992 | Bliven et al. | 379/27.01 |
| 5,353,326 A | * | 10/1994 | Jung | 379/22.03 |
| 5,825,849 A | * | 10/1998 | Garland et al. | 379/22.01 |
| 6,370,230 B1 | * | 4/2002 | Sellman | 379/22.04 |
| 6,405,053 B1 | * | 6/2002 | McGuire | 455/522 |
| 6,467,055 B1 | * | 10/2002 | Katuszonek | 714/43 |
| 2002/0062376 A1 | * | 5/2002 | Isoyama | 709/226 |

* cited by examiner

*Primary Examiner*—CongVan Tran
(74) *Attorney, Agent, or Firm*—Fay Sharpe LLP

(57) ABSTRACT

A method of testing trunks grouped in tributaries to evaluate interoffice transmission quality across a TDM network of all trunks in the office. The method includes performing a testing cycle testing only one trunk in each tributary in the central office to verify transmission quality. Testing includes setting up an interoffice connection to the one trunk, performing a transmission test on the one trunk. The method can also include attempting a connection to every trunk in each tributary in the testing cycle. The method can also include performing a plurality of testing cycles until all trunks in the central office have been tested, wherein each testing cycle includes testing one untested trunk in each tributary.

14 Claims, 4 Drawing Sheets

METHOD FOR INTEROFFICE TRUNK TESTING

BACKGROUND

The present invention relates to a method of interoffice trunk testing, and more particularly to a method of increasing trunk testing capacity and efficiency while evaluating interoffice transmission quality across a TDM network of all trunks in a central office.

To provide communication across a communications network the calling parties at each end are connected by a circuit. TDM communications networks typically provide a channel dedicated to the circuit for the duration of the call. Network operators have central offices which include a large number of lines, or trunks, which connect to other central offices across the network to form portions of the circuits for these calls.

Network operators routinely test each trunk on a regular basis, such as once a month, to ensure that they can properly connect the central offices and support quality voice transmission in an interoffice connection. In today's central offices, automated trunk testing is typically accomplished using software processes which attempt to test every trunk in the office by seizing an idle trunk, initiating an interoffice test call, allocating test equipment at both ends of the trunk, running a test to verify the transmission quality of the connection, and then disconnect the test equipment. Each trunk is tested during a testing cycle. The duration of each trunk test typically takes between 10 and 60 seconds to execute depending on the type of trunk being tested. Though multiple trunk tests can be run simultaneously, this can consume valuable call processing resources.

Typically in the past, central offices have not exceeded approximately 90 thousand trunks per office. A testing cycle, testing each of the 90,000 trunks could be completed in about a month thereby meeting the network operator's testing requirements. However, to meet the increased communications needs of customers network operators have been increasing the capacity of their central offices to handle larger numbers of calls. With the introduction of large circuit tandems, the number of trunks at central offices have grown to 256,000 trunks or more.

As the number of trunks has increased, the testing time required to complete a test cycle testing all of the trunks has become too long to meet the testing requirements of the network operators. One solution to this problem would be to test more trunks simultaneously, though this would require purchasing more testing equipment and/or consuming more valuable call processing resources. It is desirable to provide an improved trunk testing scheme which provides a higher testing capacity to ensure reliable trunk operation while minimizing the need for additional testing equipment and processing resources.

SUMMARY OF THE INVENTION

According to the present invention, a method of testing trunks grouped in tributaries to evaluate interoffice transmission quality across a TDM network of all trunks in the office is provided.

In accordance with a first aspect of the invention, the method includes performing a testing cycle testing only one trunk in each tributary in the central office to verify transmission quality. Testing includes setting up an interoffice connection to the one trunk, and performing a transmission test on the one trunk.

In accordance with a second aspect of the invention, the method can also include attempting a connection to every trunk in each tributary in the testing cycle.

In accordance with another aspect of the invention, the method can also include performing a plurality of testing cycles until all trunks in the central office have been tested, wherein each testing cycle includes testing one untested trunk in each tributary.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention may take form in certain components and structures, preferred embodiments of which will be illustrated in the accompanying drawings wherein:

FIG. 1a illustrates an enlarged view of a tributary in accordance with the invention;

DETAILED DESCRIPTION OF THE INVENTION

Figure 1:
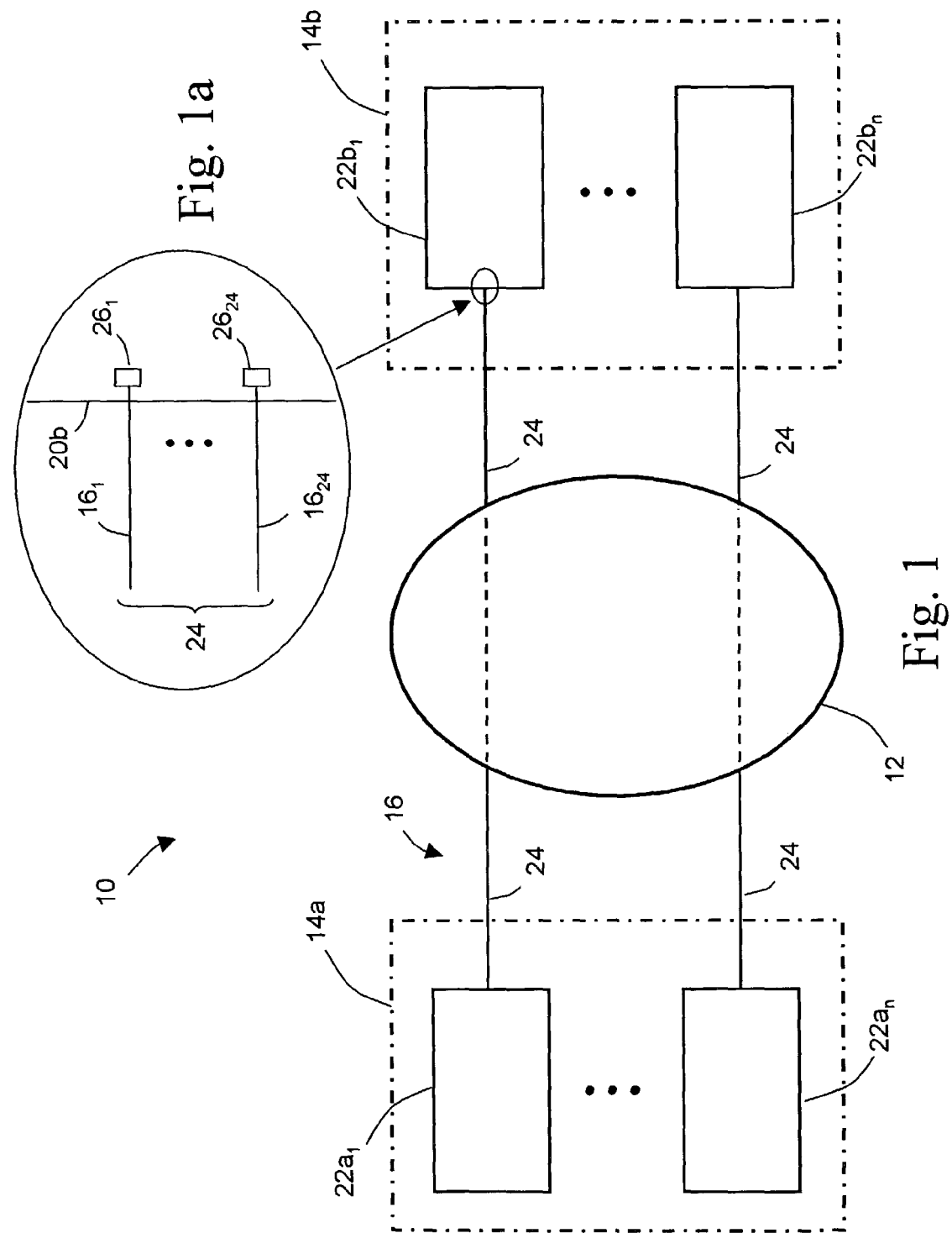
FIG. 1 illustrates tributary having trunks connected between central offices across a TDM communications network in accordance with the invention.

Referring now to FIG. 1, a portion of a communications network is shown generally at 10. The communications network 10 can be a Time Division Multiplexing (TDM) network, or any other suitable communications network. The communications network 10 includes an interoffice network 12 connecting a first central office 14a with a second central office 14b via interoffice connections known as trunks shown generally at 16. The interoffice connections across the network 12 are made using groups of trunks as described in detail below. Central offices 14a, 14b can include one or more Digital Trunk Units, a plurality of which are shown at $22a_1$-$22a_n$, $22b_1$-$22b_n$, for providing interoffice transmission of information in digital form on groups of trunks called T1s.

The smallest indivisible group of trunks connected between central offices is referred to herein as a tributary 24. Examples of a tributary 24 can include, but are not limited to, DS1s or T1s. Referring to FIG. 1a, a tributary 24 typically includes twenty four trunks $16_1$-$16_{24}$ terminating at the central office in twenty four DS0 ports $26_1$-$26_{24}$. Another tributary, known as a container, can have thirty trunks 16, though a tributary 24 can be any suitable number of trunks 16. For the purposes of this invention, the use of the term tributary 24 applies to any suitable group of trunks 16 which cannot be further divided between central offices 14a, 14b.

The tributary 24 is indivisible between central offices 14a, 14b in that all trunks grouped as a tributary originate from a single hardware source in one end office 14a, travel between offices passing through the same transmission equipment such as repeaters, multiplexers, etc., and terminate on a single hardware source in the other end office 14b. The transmission quality of any single trunk 16 contained in the tributary 24 should be the same as the other trunks in the tributary. It has, therefore, been found to be unnecessary to run a transmission test on every trunk 16 in the tributary 24 in every test cycle to evaluate interoffice transmission quality.

Figure 2:
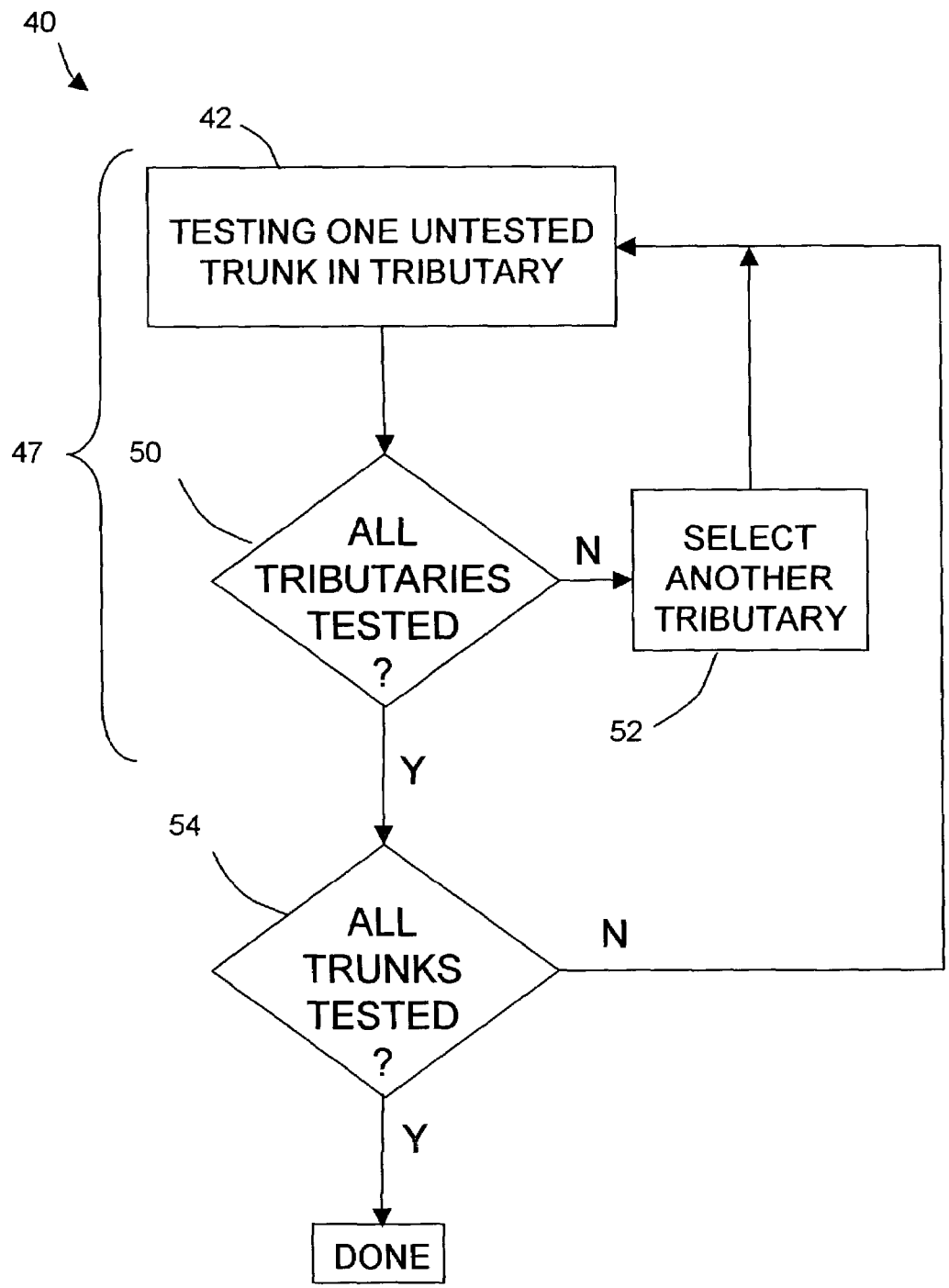
FIG. 2 illustrates steps of the invention.

Referring now to FIG. 2, a method of testing trunks 16 in a central office to evaluate interoffice transmission quality across a TDM network of all trunks in the office is shown generally at 40. The method includes testing one untested trunk in each tributary in the central office at 42 in a testing cycle.

Figure 3:
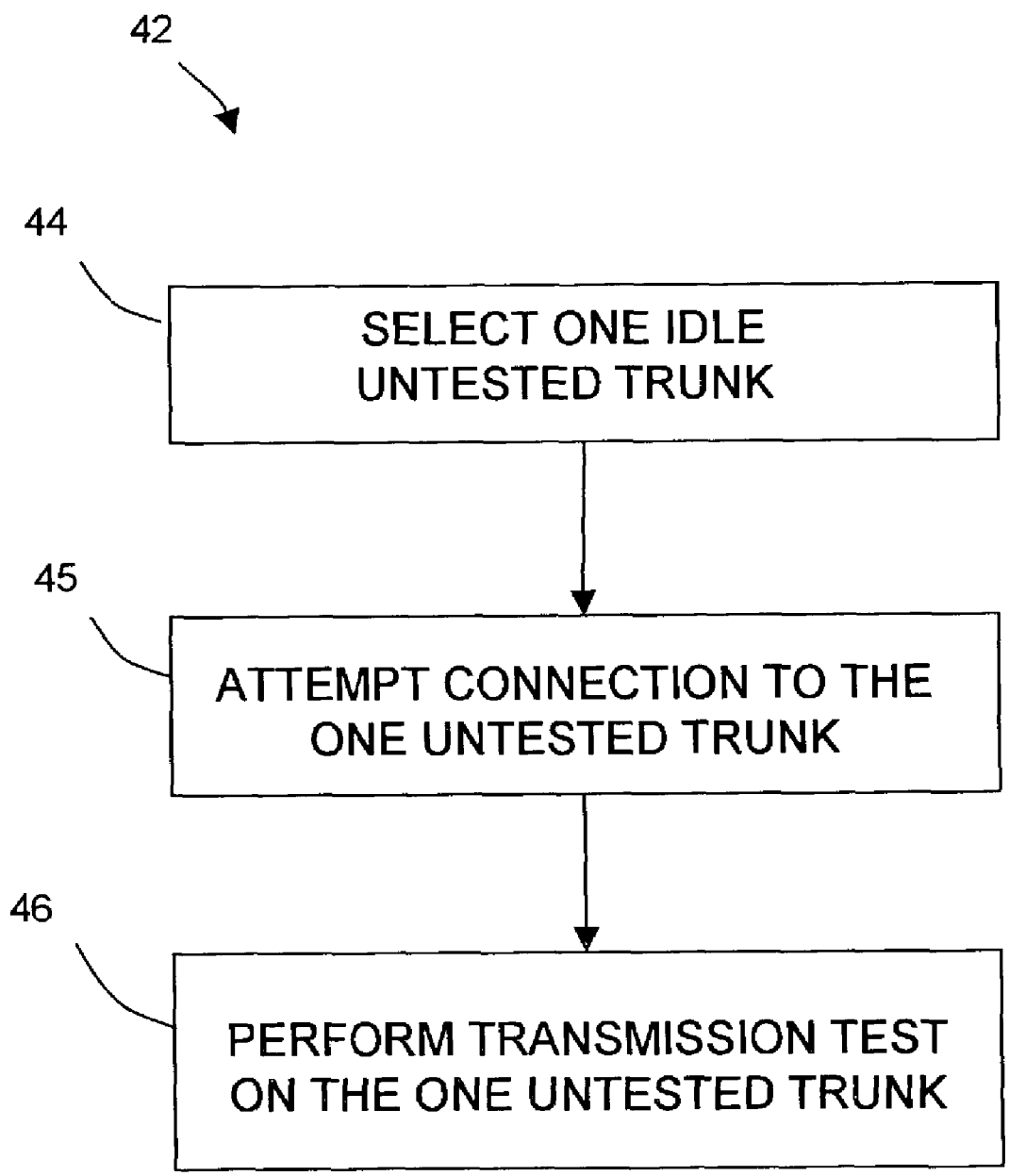
FIG. 3 illustrates the testing step in accordance with the invention.

Referring to FIG. 3, the testing step 42 includes selecting an idle untested trunk at 44 and setting up an interoffice connection to the untested trunk at 45. Setting up the interoffice connection at 45 verifies that office translations are correctly provisioned in both the central offices 14a, 14b connected by the trunk 16. Setting up the interoffice connection for one trunk 16 typically takes approximately 2 seconds.

The testing step 42 also includes performing a transmission test on the untested trunk at 46. The transmission test may test for continuity, loss also known as attenuation, and noise, and bit error rate in any suitable known manner. A transmission test typically takes 10 to 60 seconds to perform for one trunk. An untested trunk 16 becomes a tested trunk once a transmission test has been performed on it at 42.

As stated above, all trunks 16 grouped in a tributary 24 travel between offices 14a, 14b passing through the same transmission equipment and terminate on a single hardware source at both end offices, therefore the transmission quality of any single trunk contained in the tributary should be the same as the other trunks in that tributary. Therefore, if a trunk 16 passes the transmission test at 42, there is a high probability that all trunks in the tributary 24 will pass.

Referring again to FIG. 2, it is checked at 50 to see if an untested trunk has been tested in all tributaries for the testing cycle 47. If NO, another tributary 24 is selected at 52 and an untested trunk 16 in that tributary is tested at 42. If YES, the testing cycle 47 has been completed. That is, a testing cycle 47 is considered to be completed when an untested trunk has been tested for each tributary 24 in the central office 14a.

A plurality of testing cycles 47 can be performed, in a similar manner as just described, each testing cycle testing an untested trunk in each tributary, until all trunks in the central office have been tested. At 54, if all trunks in the central office 14a have been tested, all testing cycles 47 have been completed.

After the completion of one testing cycle 47, if the one trunk tested in each tributary has successfully passed the transmission quality test, there is a high probability that all trunks in the central office will pass the transmission quality test. Testing the trunks in this manner, relying on the high probability of similar performance for all trunks grouped in a tributary, reduces the trunk testing cycle considerably. A trunk testing cycle 47 can be performed, ensuring the transmission quality of all trunks in a central office, in approximately $\frac{1}{24}$th, or 4%, of the time it previously took. Further, as a result of this reduced testing cycle time, each tributary 24 can be retested in a new testing cycle more often. For example, in the prior testing scheme, a tributary in an office containing 90,000 trunks, may only be tested once a month. Using the invention, a tributary in an office containing 90,000 trunks can be tested every day or two if so desired.

Figure 4:
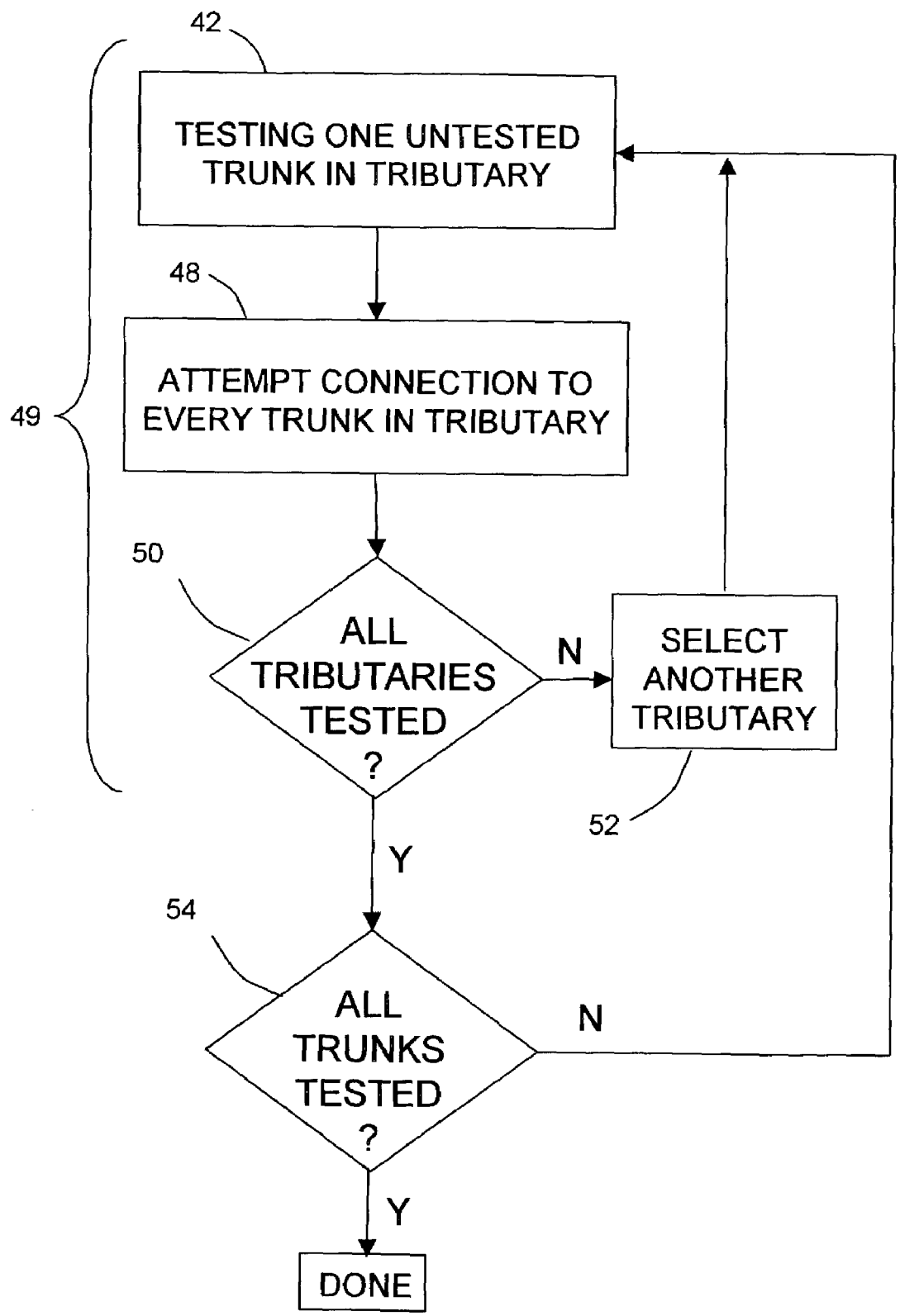
FIG. 4 illustrates steps of the invention.

Referring to FIG. 4, the method can also include attempting to set up an interoffice connection to every trunk in each tributary at 48, yet only running a transmission test on one trunk in each tributary 24, for each testing cycle shown now at 49. For the purposes of this invention, a trunk 16 for which a connection was attempted to be set up, or was set up, is considered to be untested if a transmission test was not performed on the trunk. If, at the completion of a testing cycle 49, a connection is set up for every trunk 16 and every trunk tested passes the transmission test, there is even a higher probability than the testing cycle 47 discussed above, that all trunks in the central office 14a will pass the transmission quality test.

The invention uses a trunk test scheduler that selects and runs a transmission test on only one trunk 16 in each tributary 24 during each automated trunk testing cycle 47, 49. The remaining trunks 16 in the tributary 24 are accessed and interoffice connections are set-up if the trunk is idle, but no transmission test is run. Setting up these connections, without running a transmission test verifies that office translations are correctly provisioned in both end offices 14a, 14b for every trunk in the tributary 24. This embodiment of the invention takes only approximately 2 seconds per trunk as compared to 10 to 60 seconds per trunk in prior testing schemes. This invention provides the advantage of increasing the trunk testing capacity by reducing the time required to complete a trunk testing cycle 49 used to ensure the transmission quality of all trunks in a central office. Therefore, this invention ensures interoffice transmission quality across the TDM network of all the trunks grouped in tributaries in the central office.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

We claim:

1. A method of testing interoffice trunks grouped in tributaries extending between central offices in a TDM communications network, the method comprising:
   performing one testing cycle testing only one trunk in each tributary in a central office to evaluate interoffice transmission quality across the TDM network of all trunks in the central office from the one testing cycle, wherein testing comprises:
   setting up an interoffice connection to the one trunk in each tributary;
   performing a transmission test on the one trunk in each tributary; and
   determining if one trunk has been tested in all tributaries in the central office for the one testing cycle.

2. The method defined in claim 1 further comprising:
   performing a plurality of testing cycles until all trunks in the central office have been tested, wherein each testing cycle includes testing one untested trunk in each tributary.

3. The method defined in claim 2 further comprising:
   attempting a connection to every trunk in each tributary in each testing cycle.

4. The method defined in claim 2 wherein the tributary is a T1.

5. The method defined in claim 4 wherein the T1 has 24 trunks.

6. The method defined in claim 2 wherein the tributary is a container.

7. The method defined in claim 6 wherein the container has 30 trunks.

8. A method of evaluating interoffice transmission quality across a TDM network comprising:
   evaluating interoffice transmission quality in the TDM network of all interoffice trunks grouped in tributaries in a central office by performing one testing cycle testing only one trunk in each tributary in the central office, wherein testing comprises:
   setting up an interoffice connection to the one trunk;
   performing a transmission test on the one trunk; and
   determining if one trunk has been tested in all tributaries in the central office for the one testing cycle.

9. The method defined in claim 8 further comprising:
   performing a plurality of testing cycles until all trunks in the central office have been tested, wherein each testing cycle includes testing one untested trunk in each tributary.

10. The method defined in claim 9 further comprising:
    attempting a connection to every trunk in each tributary in each testing cycle.

11. The method defined in claim 9 wherein the tributary is a T1.

12. The method defined in claim 11 wherein the T1 has 24 trunks.

13. The method defined in claim 9 wherein the tributary is a container.

14. The method defined in claim 13 wherein the container has 30 trunks.

* * * * *